(12) United States Patent
Cesare et al.

(10) Patent No.: US 7,120,638 B1
(45) Date of Patent: Oct. 10, 2006

(54) METHOD, SYSTEM, PROGRAM, AND DATA STRUCTURE FOR CLEANING A DATABASE TABLE

(75) Inventors: Mark Anthony Cesare, San Francisco, CA (US); Tom Robert Christopher, Morgan Hill, CA (US); Julie Ann Jerves, Saratoga, CA (US); Richard Henry Mandel, III, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/399,694

(22) Filed: Sep. 21, 1999

(51) Int. Cl.
   *G06F 7/00* (2006.01)
(52) U.S. Cl. .............................. 707/101; 707/4; 707/6; 707/104.1
(58) Field of Classification Search .................... 707/4, 707/6, 100, 104, 101, 102, 104.1
See application file for complete search history.

(56) References Cited

U.S. PATENT DOCUMENTS

| | | |
|---|---|---|
| 4,876,733 A | 10/1989 | Lavin |
| 4,930,071 A | 5/1990 | Tou et al. |
| 5,196,924 A | 3/1993 | Lumelsky et al. |
| 5,282,147 A | 1/1994 | Goetz et al. |
| 5,299,304 A | 3/1994 | Williams et al. |
| 5,321,797 A | 6/1994 | Morton |
| 5,367,675 A | 11/1994 | Cheng et al. |
| 5,548,749 A | 8/1996 | Kroenke et al. |
| 5,548,754 A | 8/1996 | Pirahesh et al. |
| 5,548,755 A | 8/1996 | Leung et al. |
| 5,548,758 A | 8/1996 | Pirahesh et al. |
| 5,560,005 A | 9/1996 | Hoover et al. |
| 5,584,024 A | 12/1996 | Schwartz |
| 5,588,150 A | 12/1996 | Lin et al. |
| 5,590,321 A | 12/1996 | Lin et al. |
| 5,590,324 A | 12/1996 | Leung et al. |
| 5,596,752 A * | 1/1997 | Knudsen et al. |
| 5,598,559 A | 1/1997 | Chaudhuri |
| 5,615,361 A | 3/1997 | Leung et al. |
| 5,687,362 A | 11/1997 | Bhargava et al. |

(Continued)

FOREIGN PATENT DOCUMENTS

JP        7182179        7/1995

(Continued)

OTHER PUBLICATIONS

Ressell Borland, Microsoft 97, 1997, Microsoft Corporation, pp. 97-123.*

(Continued)

*Primary Examiner*—Shahid Alam
*Assistant Examiner*—Hung Pham
(74) *Attorney, Agent, or Firm*—David W. Victor; Konrad Raynes & Victor LLP (57) ABSTRACT

Disclosed is a method, system, program, and data structure for performing a clean operation on an input table. The input table to clean is indicated in an input data table name. At least one rule definition is processed to clean the input table. Each rule definition indicates a find criteria, a replacement value, and an input data column in the input table. For each rule definition, the input data column is searched for any fields that match the find criteria. The replacement value for the particular rule definition is inserted in the fields in the input data column that match the find criteria. Subsequent applications of additional rule definitions applied to the same input data column operate on replacement values inserted in the input data column during previously applied rule definitions.

4 Claims, 10 Drawing Sheets

U.S. PATENT DOCUMENTS

| | | | |
|---|---|---|---|
| 5,694,591 A | | 12/1997 | Du et al. |
| 5,701,454 A | | 12/1997 | Bhargava et al. |
| 5,724,570 A | | 3/1998 | Zeller et al. |
| 5,724,575 A | | 3/1998 | Hoover et al. |
| 5,737,592 A | | 4/1998 | Nguyen et al. |
| 5,737,600 A | * | 4/1998 | Geiner et al. |
| 5,742,806 A | | 4/1998 | Reiner et al. |
| 5,905,982 A | | 5/1999 | Carey et al. |
| 5,987,474 A | * | 11/1999 | Sandifer ............... 707/104 |
| 6,178,421 B1 | * | 1/2001 | Dahlen et al. ............. 707/8 |
| 6,185,552 B1 | * | 2/2001 | DeLong et al. ............ 707/3 |
| 6,266,663 B1 | * | 7/2001 | Fuh et al. .................. 707/4 |
| 6,282,540 B1 | * | 8/2001 | Goldensher et al. ....... 707/6 |
| 6,298,342 B1 | * | 10/2001 | Graefe et al. .............. 707/4 |
| 6,308,177 B1 | * | 10/2001 | Israni et al. ............ 707/100 |
| 6,370,522 B1 | * | 4/2002 | Agarwal et al. ........... 707/2 |

FOREIGN PATENT DOCUMENTS

| | | |
|---|---|---|
| JP | 7244603 | 9/1995 |
| JP | 8241330 | 9/1996 |
| JP | 9179882 | 7/1997 |
| WO | 9636003 | 11/1996 |

OTHER PUBLICATIONS

International Business Machines Corporation, IBM's Data Mining Technology, White Paper; Data Management Solutions,(c) 1996.

International Business Machines Corporation, IBM Visual Warehouse for Windows NT, Managing Visual Warehouse, (c) 1998.

IBM Technical Disclosure Bulletin, Efficient Logging of Transactions on Persistent Information tin General and Data bases in Particular, vol. 40,No. 11, Nov. 1997 (c) 1997; pp. 117-120.

IBM Technical Disclosure Bulletin, Transformation of an Entity-Relationship Model into a System Object Model, Nov., 1994, pp. 631-634.

IBM Technical Disclosure Bulletin, Branch Set Preserving Transformations of Hierarchical Data Structure, vol. 23, No. 7B, Dec. 1980, (c) 1980; pp. 3090-3094.

IBM Technical Disclosure Bulletin, Intelligent Miner, vol. 40, No. 02, Feb. 1997; pp. 121-125.

Hohenstein, U. and C. Korner. "A Graphical Tool for Specifying Semantic Enrichment of Relational Databases." Database Applications Semantics. Proceedings of the IFIP WG 2.6 Working Conference on Database Applications Semantics (DS-6), May 30-Jun. 2, 1995, pp. 389-420, Published: London, UK, 1997, vii+610 pp., Chapman & Hall (Abstract).

Dendrinos, MN. "A Case Study for the Management of a Set of Spectrally Analysed Signals Based on OODBMS." Proceedings IDEAS '97. International Database Engineering and Applications Symposium (Cat. No. 97TB100166), Aug. 25-27, 1997, pp. 121-125, Published: Los Alamitos, CA, USA, 1997, xii+403 pp., IEEE (Abstract).

Correl, S. and DP Miranker. "On Isolation, Concurrency and the Venus Rule Language." Proceedings of the 1995 ACM CIKM International Conference on Information and Knowledge Management, Nov. 28-Dec. 2, 1995, pp. 281-289, Published: New York, NY, USA, 1995, xvi+418 pp., ACM (Abstract).

*Design and Implementation of Derivation Rules in Information Systems*, by R. Winter. Data & Knowledge Engineering, vol. 26, (1998), pp. 225-241.

*Realizing Object-Relational Databases by Mixing Tables with Objects.*, by C. Liu, et al. CRC for Distributed Systems Technology, School of Information Technology, The University of Queensland, Brisbane, Australia, pp. 335-346.

*SuperSQL: An Extended SQL for Database Publishing and Presentation.*, by M. Toyama. Department of Information and Computer Science, Keio University, Yokohama, JP, pp. 584-586.

*A Starburst is Born*, by G. Lapis, et al. IBM Almaden Research Center, San Jose, CA. 1 page.

*Datalog Rule Evaluation in Associative Computers and Massively Parallel SIMD Machines*, by O. Cho, et al. Department of Computer Science, The University of Queensland, Brisbane, Australia, pp. 56.

*Framework for Query Optimization in Distributed Statistical Databases*, by Sadreddini, M.H., et al. Information and Software Technology, vol. 34, No. 6, Jun. 1992, pp. 363-377.

ACM, 1983. Incomplete Information and Dependencies in Relational Databases* (*Preliminary Version), by T. Imielinski. Sigmod Record Issue Vo. 13, No. 4, pp. 178-184.

*Abstraction in Query Processing*, by T. Imielinski. Journal of the Association for Computing, vol. 38, No. 3, Jul. 1991, pp. 534-558.

* cited by examiner

| FIND PATTERN | REPLACEMENT TEXT VALUE |

FIG. 3a

| FIND VALUE | REPLACEMENT TEXT VALUE |

FIG. 3b

| LOWER BOUND | UPPER BOUND | REPLACEMENT VALUE |

FIG. 4

| LOWER BOUND | LOWER REPLACEMENT VALUE | UPPER BOUND | UPPER REPLACEMENT VALUE |

| CITY | PRODUCT NAME | PRODUCT CATEGORY | SALES ($) | UNIT SALES |
|---|---|---|---|---|
| VARCHAR (20) | VARCHAR (30) | VARCHAR (15) | DECIMAL (8,2) | INTEGER |
| 11%LAX455 | PICK AXE | IATE | 5897.32 | 1100 |
| SJC1298%SEA | SMALL SHOVEL | JXJ8972 | 456.98 | 43 |
| %LAX6%SFO94 | TARP | HAU1245 | 893.12 | 422 |
| %SJC34LAX45 | FLARES | AX111 | 1200.45 | 1189 |
| 4515%SEA | NULL | AC183 | 333.9 | 23 |
| 3452%SJC34 | "" | MIS222 | 1818.4 | 15002 |

FIG. 7

| FIND VALUE | REPLACE VALUE |
|---|---|
| VARCHAR (10) | VARCHAR (20) |
| %%LAX% | LOS ANGELES |
| %%DFW% | DALLAS/FORT WORTH |
| %%SJC% | SAN JOSE, CA |
| %%SFO% | SAN FRANCISCO |
| %%SEA% | SEATTLE/TACOMA |

FIG. 8a

| LOWER BOUND | LOWER REPLACEMENT | UPPER BOUND | UPPER REPLACEMENT |
|---|---|---|---|
| INTEGER | INTEGER | INTEGER | INTEGER |
| 100 | 100 | 15000 | NULL |

FIG. 8b

| SORT COLUMN | LOWER BOUND | UPPER BOUND | REPLACE VALUE |
|---|---|---|---|
| INTEGER | VARCHAR (6) | VARCHAR (6) | VARCHAR (10) |
| 1 | I | IZZZZ | SPECIAL |
| 2 | HA | JZ | HARDWARE |
| 3 | LA | NZ | MISCEL |
| 4 | AA | BJ | WINTER STORM |
| 5 | RX | NULL | WINTER STORM |

FIG. 8c

| FIND VALUE | REPLACE VALUE |
|---|---|
| VARCHAR (5) | VARCHAR (10) |
| NULL | "" |

FIG. 8d

METHOD, SYSTEM, PROGRAM, AND DATA STRUCTURE FOR CLEANING A DATABASE TABLE

CROSS-REFERENCE TO RELATED APPLICATIONS

This application is related to the following commonly-assigned patents and co-pending patent applications, all of which are filed on the same date herewith, and which are incorporated herein by reference in their entirety:

"Method, System, Program, And Data Structure for Transforming Database Tables," to Mark A. Cesare, Tom R. Christopher, Julie A. Jerves, Richard H. Mandel III, and having and application Ser. No. 09/400,507;

"Method, System, Program, And Data Structure for Pivoting Columns in a Database Table," to Mark A. Cesare, Julie A. Jerves, and Richard H. Mandel III, and having, application Ser. No. 09/400,057, and U.S. Pat. No. 6,604,095, issued on Aug. 5, 2003;

"Method, System, and Program for Inverting Columns in a Database Table," to Mark A. Cesare, Julie A. Jerves, and Richard L. Mandel III, and having, application Ser. No. 09/400,690, and U.S. Pat. No. 6,748,389, issued on Jun. 8, 2004; and "Method, System, Program, And Data Structure For Cleaning a Database Table Using a Look-up Table," Mark A. Cesare, Julie A. Jerves, and Richard H. Mandel III, and having and application Ser. No. 09/401,006.

BACKGROUND OF THE INVENTION

1. Field of the Invention

The present invention relates to a method, system, program, and data structure for cleaning a database table and, in particular, for performing clean operations on columns in the database table.

2. Description of the Related Art

Data records in a computer database are maintained in tables, which are a collection of rows all having the same columns. Each column maintains information on a particular type of data for the data records which comprise the rows. A data warehouse is a large scale database including millions or billions of records defining business or other types of transactions or activities. Data warehouses contain a wide variety of data that present a coherent picture of business or organizational conditions over time. Various data analysis and mining tools are provided with the data warehouse to allow users to effectively analyze, manage and access large-scale databases to support management decision making. Data mining is the process of extracting valid and previously unknown information from large databases and using it to make crucial business decisions. In many real-world domains such as marketing analysis, financial analysis, fraud detection, etc, information extraction requires the cooperative use of several data mining operations and techniques.

Once the desired database tables have been selected and the data to be mined has been identified, transformations on the data may be necessary. Transformations vary from conversions of one type of data to another, e.g., converting nominal values into numeric ones so that they can be processed by a neural network, to definition of new attributes, i.e., derived attributes. New attributes are defined either by applying mathematical or logical operators on the values of one or more database attributes. The transformed data is stored in a target database where it may then be mined using one or more techniques to extract the desired type of information necessary to make the organizational decisions. Further details of data mining are described in the International Business Machines Corporation (IBM) publication entitled "White Paper: Data Mining Solutions" (IBM Copyright, 1996)

Data transformation refers to the process of filtering, merging, decoding, and translating source data to create validated data for the data warehouse and data mining tools. For example, a numeric regional code might be replaced with the name of the region. Data transformations and cleansing is used when data is inconsistent or incompatible between sources. In such case, some level of data cleansing is needed to ensure data consistency and accuracy. Some of the current techniques for transforming and cleansing data include the use of an SQL WHERE clause to limit the rows extracted from the source table. Further, formulas and expressions specified in the column definition window and constants and tokens are used to eliminate and modify data.

Previous versions of IBM Visual Warehouse included programs to allow users to perform numerous functions on the source data. For instance, if one database table has revenue data in U.S. dollars and another data table stores revenue data in foreign currency denominations, then the foreign revenue data must be cleansed before both sets of data can be analyzed together. Transformation operations may be performed using application programs external to the database program that process and transform tables of data records. Further details of data warehousing and data transforms, are described in the IBM publications "Managing Visual Warehouse, Version 3.1," IBM document no. GC26-8822-01 (IBM Copyright, January, 1998), which is incorporated herein by reference in its entirety.

Notwithstanding current programs for cleansing data, there is a need in the art to provide users greater control over operations to clean input data.

SUMMARY OF THE PREFERRED EMBODIMENTS

To overcome the limitations in the prior art described above, preferred embodiments disclose a method, system, program, and data structure for performing a clean operation on an input table. The input table to clean is indicated in an input data table name. At least one rule definition is processed to clean the input table. Each rule definition indicates a find criteria, a replacement value, and an input data column in the input table. For each rule definition, the input data column is searched for any fields that match the find criteria. The replacement value for the particular rule definition is inserted in the fields in the input data column that match the find criteria. Subsequent applications of additional rule definitions applied to the same input data column operate on replacement values inserted in the input data column during previously applied rule definitions.

In further embodiments, each rule definition is associated with one rule table including the find criteria and replacement value. In such case, a rule table column parameter is provided for each rule definition indicating the columns in the rule table including the find criteria and replacement value for that rule definition. In certain embodiments, two rule definitions may have the same rule table. In such case, the rule table column parameters indicate different columns in the same rule table including the find criteria and replacement value for each rule definition. In still further embodiments, a separate rule table may include the find criteria and replacement value for different rule definitions.

Still further, a rule definition may include multiple find criteria and a corresponding replacement value for each find criteria. In such case, the step of searching the input data column comprises applying each of the multiple find criteria to one field until a match occurs or none of the multiple find criteria are found to match the field content. When a match is found, the replacement value corresponding to the find criteria is inserted in the field having the matching content.

In preferred embodiments, the rule definition may define a find and replace rule, a discretization rule or a numeric clip rule. Different rule definitions may define different rule types.

In preferred embodiments, the rule definitions may be communicated from one computer system, such as a client, to a computer system including the input data table, such as a database server. The rule definitions are then executed against the input table on the database server including the input tables.

Preferred embodiments provide a data command structure including one or more rule definitions for performing different operations on the data in an input data table. The preferred embodiments provide a command structure that accommodates multiple types of clean operations to be performed on an input data table before the input data table is written to the output table. Further, preferred embodiments allow a client to transfer clean commands including to the database server including the database for execution on the database server. This reduces network traffic as the database tables subject to the clean operation do not have to be transferred between the database server and the client constructing the clean commands. Further, in preferred embodiments, the rule definitions are maintained in rule tables in the server. This further reduces network traffic as the clean command need only specify the location of rules to apply and does not have to provide tables of rules.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
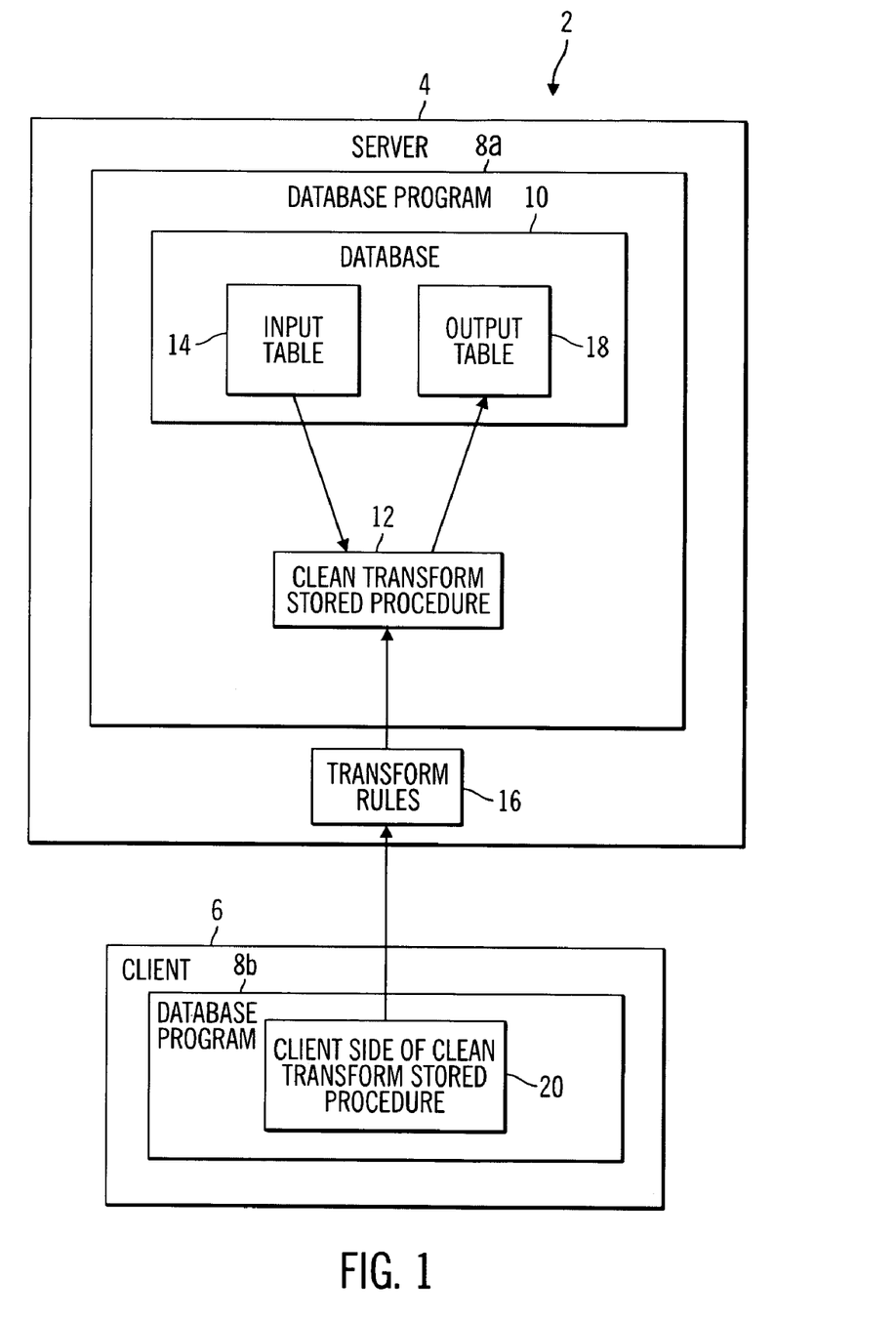
FIG. 1 illustrates a computing environment in which preferred embodiments are implemented.

FIG. 1 illustrates a computing environment 2 in which preferred embodiments are implemented. The environment 2 includes a server 4 and client 6. The server 4 and client 6 would include an operating system, such as MICROSOFT WINDOWS 98 and WINDOWS NT, AIX, OS/390, OS/400, OS/2, and SUN SOLARIS,** and may be comprised of any suitable server and client architecture known in the art. The server 4 and client 6 include a database program 8a and 8b, wherein 8a comprises the server 4 side of the database program and 8b comprises the client 6 side. The server 4 and client 6 may communicate via any communication means known in the art, such as a telephone line, dedicated cable or network line, etc, using any protocol known in the art including TCP/IP network (e.g., an Intranet, the Internet), LAN, Ethernet, WAN, System Area Network (SAN), Token Ring, etc. Alternatively, there may be separate and different networks between the servers 4 and client 6.

**Microsoft, Windows, Windows NT are registered trademarks and Microsoft SQL Server is a trademark of Microsoft Corporation; DB2, AIX, OS/390, OS/400, and OS/2 are registered trademarks of IBM; and Oracle8 is a trademark of Oracle Corporation; and Solaris is a trademark of Sun Microsystem, Inc.

The client/server database programs 8a, b, may be comprised of any client/server database program known in the art, such as DB2, Oracle Corporation's ORACLE 8, Microsoft SQL Server,** etc. The database programs 8a and 8b are used to access operations and perform operations with respect to information maintained in one or more databases 10. The database(s) 10 would consist of multiple tables having rows and columns of data, e.g., tables 14 and 18. Further details of the architecture and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

**Microsoft, Windows, Windows NT are registered trademarks and Microsoft SQL Server is a trademark of Microsoft Corporation; DB2, AIX, OS/390, OS/400, and OS/2 are registered trademarks of IBM; and Oracle8 is a trademark of Oracle Corporation; and Solaris is a trademark of Sun Microsystem, Inc.

In preferred embodiments, the clean transform program is implemented using the IBM stored procedure database program structure. A stored procedure is a block of procedural constructs and embedded SQL statements, i.e., an application program, that is stored in a database and can be called by name. Stored procedures allow an application program to execute in two parts. One part runs on the client and the other on the server. This allows one client call to produce several accesses of the database from the application program executing on the system, i.e., server including the database. Stored procedures are particularly useful to process a large number of database records, e.g., millions to billions of records, without having to transfer data between the server 4 and client 6. The client stored procedure passes input information to the server stored procedure which then, executing within the database program 8 including the database 10, processes numerous database records according to such client input information. The server stored procedure program is initiated by the client, and during execution the client cannot communicate with the stored procedure executing in the server. Further details of stored procedures are described in the publication "A Complete Guide to DB2 Universal Database," "A Complete Guide to DB2 Universal Database," which was incorporated by reference above.

The clean transform of the preferred embodiments is implemented as a stored procedure application program 12 in the server 4. The clean transform stored procedure 12 receives as input a name of an input table 14 in the database 10, and transform rules 16 from the client 6 specifying the clean operations to perform on the data in the named input table 14. The results of the clean operations performed by the clean transform stored procedure 12 in response to the transform rules 16 are generated into the output table 18. Alternatively, the transformed, i.e., cleaned input table is written to the database 10 to overwrite the previous version of the input table.

The client side of the clean transform stored procedure 20 generates the transform rules 16 that specify the clean operations to perform and initiate execution of the clean transform stored procedure 12. The rules specified by the client side 20 are capable of implementing the following clean operations at the server 4: replace values in selected data columns that are missing, nonvalid, or inconsistent with appropriate substitute values; remove unsuitable data rows; clip numeric values; perform numeric discretization; remove excess white space from text; copy columns from the source table to the target table. Further, the client generated rules 16 can instruct the clean transform stored procedure 12 to ignore case and white spaces when locating strings and permit a tolerance value for numeric data.

In preferred embodiments, the client side 8b can pass parameters to the clean transform stored procedure as "host variables" or embedded in a CALL statement. In either case, the parameters or transform rules 16 must be specified to control the operation of the clean transform 12.

Structure and Operation of the Clean Transform Rules

A graphical user interface (GUI) at the client 6 may be used to enter various input parameters to control a clean operation. In response to such user input, the client side 20 would generate an application program interface (API) call to the clean transform stored procedure 12 including the parameters shown in FIG. 2 to initiate and control the operation of the clean transform stored procedure 12. The clean parameter field 50 shown in FIG. 2 includes an input table name 52, output table name 54, log table name 56, run ID 58, and replacement rule definition(s) 60.

Figure 2:
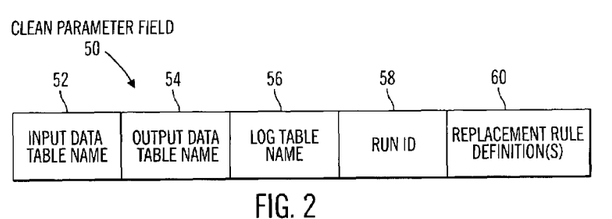
FIG. 2 illustrates the parameters used in a transform command to clean input tables in accordance with preferred embodiments of the present invention.

The input table name 52 specifies the input table 14 table including the data subject to the clean operations and the output table name 54, which is optional, specifies the output table 18 where the cleaned data from the input table 14 is placed. The log table name 56 indicates the name of a log file into which warnings and exceptions that occur during execution of the clean transform stored procedure 12 are stored. The run ID 58 appears in the log file and is used to identify the transform operations for which the log entry was made. The replacement rule definition(s) 60 identifies an input column from the input table 14 and an output column in the output table 18, and one or more rules to use when processing the input columns. The specified field of parameters 50 defines the transform rules 16 the client side of the clean transform stored procedure 20 presents to the clean transform stored procedure 12 in the server 4.

The replacement rule definitions 60 parameter comprises one or more definitions, such that each definition 80 includes sub-parameters 82–100. Thus, the rule definitions parameter 60 may specify multiple distinct rule definitions 80, each describing particular operations to perform on specified columns in the input table. Below is a description of the sub-parameters included in each definition 80 a user may specify in the rule definitions parameter 60:

Input Data Column Name 82—defines an existing column in the table having the Input Data Table Name 52 that contains the data to be operated on in accordance with the rules specified in the rule table and other parameters. This parameter is required in the definition 80. The input data column must be capable of being modified, so that the clean transform stored procedure 12 will not update a value which has a constraint, such as for a unique key column or a referential constraint.

Output Data Column Name 84: defines the name of a column in the table having the Output Data Table Name 54 where cleaned data is placed. This parameter is optional, and the default is the input data column name 82. Thus, if no output data column or output table is specified, clean data is placed back into the copy of the input table in memory being processed.

Rule Table Name 86: Provides the name of the table containing the "find and replace" rule patterns. This sub-parameter is optional; if not provided the values for the column are copied to the output table, and are only modified if the option to compress or remove white space is specified. In preferred embodiments, the rule tables are maintained in the server 4 and are specified in the rule definitions.

Rule Table Sort-Key Column Name 88: When a rule table includes multiple rules to apply to the input data column, this parameter 88 indicates a sort key-column in the rule table that provides an ordering in which the rules are applied to rows (fields) in the input data column.

Rule 90: This sub-parameter is required if the rule table name 86 is specified. This sub-parameter defines the type of rule included in the rule table to use when processing the values in the input data column. Further details of rule 90 are described below.

Rule Table Columns 92: This sub-parameter is specified if the rule table name is specified. The number of columns depend on the rules, examples of which are discussed below. If a rule table has different columns for different rule definitions, i.e., one rule table stores multiple rule definitions, then the rule table columns 92 parameter indicates those columns in the rule table including the specific rules for one rule definition.

Row Clean Indicator 94: Boolean YES/NO value. If YES is specified and there is a match in the input data column to the "find" condition, then the input value is not copied to the output table and the located matching rows are deleted from the temporary input table. Note that the setting this parameter to YES will affect subsequent attempts to process the transitional input data columns as the matching entries in the input data columns subject to the row clean indicator 94 are empty. If the value for this sub-parameter is NO, the matching entry in the input data column is copied to the output data column or the input data column. Further, any replacement value in a rule table is ignored and need not be specified when the row clean indicator is used. This sub-parameter is optional, and is ignored unless a rule table name 86 is specified.

Rule Escape Character 96: Certain characters have special meaning, such as the percent sign (%), which represents any string of zero or more characters, or the underscore character (_), which represents a single character. The use of the rule escape character in the search string followed by the special character, means that the query looks for the actual special character following the escape character, and ignores the special meaning.

White Space Indicator 98: Optional boolean value that indicates whether white spaces are ignored when searching Numeric Tolerance 100: Specifies a tolerance value when doing a "find" operation with respect to numeric values. Thus, numbers within the "tolerance" range of the searched upon number will produce a match.

A rule table may include columns for different rule definitions. In preferred embodiments the rule table is maintained in the database program 8*a* for direct access by the clean transform 12. In this way, users can utilize predefined clean rules in a rule table in the database program 8*a*. The rule table may include one find column used in two rule definitions and different columns for the replacement values for the two rule definitions having the same find value. Thus, both rule definitions search on the same criteria, but provide different replacement values. Alternatively, the rule table may have different columns for the find criteria for two rule definitions, but the same replacement value for the different columns including the find criteria. Still further, the rule table may include multiple search criteria for a single rule definition and a corresponding search value for each of the search criteria. In this way, multiple search criteria could be applied to the same input column as part of one rule definition. Upon finding the first find value matching the field content, the replacement value corresponding to that matching find value would be inserted into the matching field.

Moreover, multiple rules in different columns of the same rule table or in different rule tables may sequentially operate against the same input data column. If more then one set of rules is to be applied to an input data column, a definition 80 must be specified for each rule. The order of the definitions listed in the replacement rule definitions 60 parameter indicates the order in which the rules are applied to the input data column. In this way, values in the input data column may be modified in sequence and processed according to clean operations specified in different rule definitions. In preferred embodiments, the processing of subsequent rule definitions on the same column will depend on any replacement values inserted in the field during the application of a previous rule definition, not the original content in the input data column. Thus, rule definitions are applied to the copy of the input data table in memory as it is being processed. The find operation with respect to a field will apply to any previously inserted replacement value inserted into the field. If this inserted replacement value matches the search criteria of the subsequent rule definition, then another replacement value will be inserted into the field.

The rule sub-parameter 90 indicates the type of rule indicated in the table identified in the rule table name sub-parameter 86. Possible values for rule type could include find and replace, discretize, numeric clip or any other find and replace type operations known in the art. A find and replace locates a field in the input data column matching the find value. This find value is specified in one column of the rule table. The column including the find rule is provided in the first rule table column identified in sub-parameter 92. This rule table column would further identify a second column in the rule table including a replacement value. If the find operation produces a match on the find value, then the replacement value is inserted in the field having the content matching the find value. The specification of the value to find in the rule table column must match the type of data in the input data column, e.g., only numbers are allowed in numeric "find" columns, pattern strings are allowed for character columns. Further for either numeric or character data, the database null value can be used as a find or replacement value.

Figure 3A:
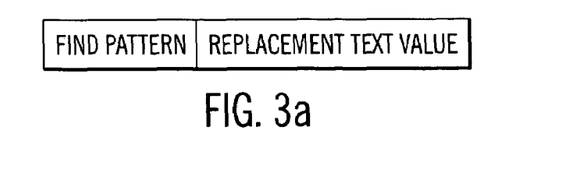
FIGS. 3a, 3b, 4, and 5 illustrate examples of a rule table to clean data in accordance with preferred embodiments of the present invention.
Figure 3B:
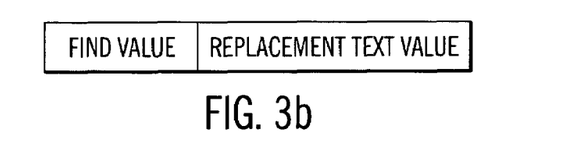

FIGS. 3*a* and 3*b* illustrate a possible format for rule tables for a find and replacement rule type. FIG. 3*a* illustrates a two column find and replace rule table for an input data column including character values. The find pattern is what is searched for in the input data column and the replacement text value is what is inserted into the field matching the find pattern. FIG. 3*b* illustrates a similar two column find and replace rule table for an input column having numerical values.

Figure 4:
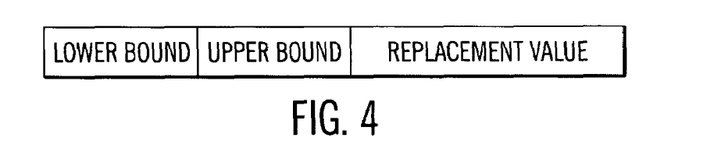

If the rule 90 indicates a discretization type, then there is both an upper and lower bound for the find value. The find operation can specify to search for matching values in the input data column that are between the upper and lower bounds, outside of the upper and lower bounds, less than the lower bound, or greater than the upper bounds. Another column in the rule table would specify a replacement operation to perform. If the upper and lower boundaries specified character strings, then SQL rules would be used to determine whether strings in the input data column satisfy the search criteria. FIG. 4 illustrates a table format for discretization for character and numeric data types. The replacement value is inserted into every field in the input data column having a value between the upper and lower bounds. Placement of the NULL indicator in the upper or lower bounds can affect whether the find seeks all fields in the input data column greater or less than one of the bounds. The discussion below with respect to FIGS. 6*b* and 6*c* explains how a NULL value in one of the find values affects the search criteria.

Figure 5:
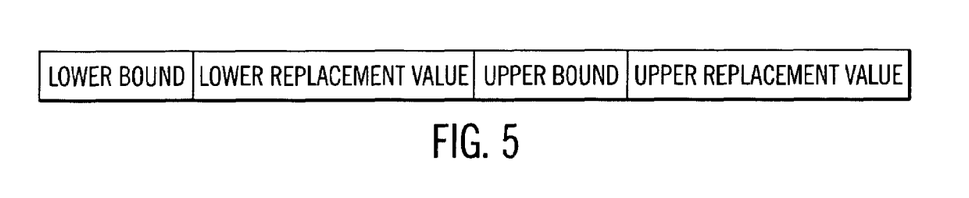

If the rule 90 indicates a numeric clip type, then the find operation finds fields in the input data column that are less than, equal to or greater than specified values. FIG. 5 shows that discretization includes an upper and lower values for both the find and replace. Any values in the input data column less than the lower bound and greater than the upper bound are replaced with the lower and upper replacement value, respectively. As with discretization, the use of the NULL value in one of the find values can affect the find operation, as discussed below with respect to FIGS. 6*d* and 6*e*.

For find and replacement, discretization, and numeric clip rule types, the database NULL value can be used as the find or replacement value. The NULL value indicates the absence of information. The database NULL value is only allowed for a pattern find value or replacement value if the database input column allows for NULL values, i.e., the input data column was not defined with a NOT NULL clause. The database NULL value may also be used to determine how to consider lower and upper bound values in the discretization and numeric clip operations, as described below.

Figure 6A:
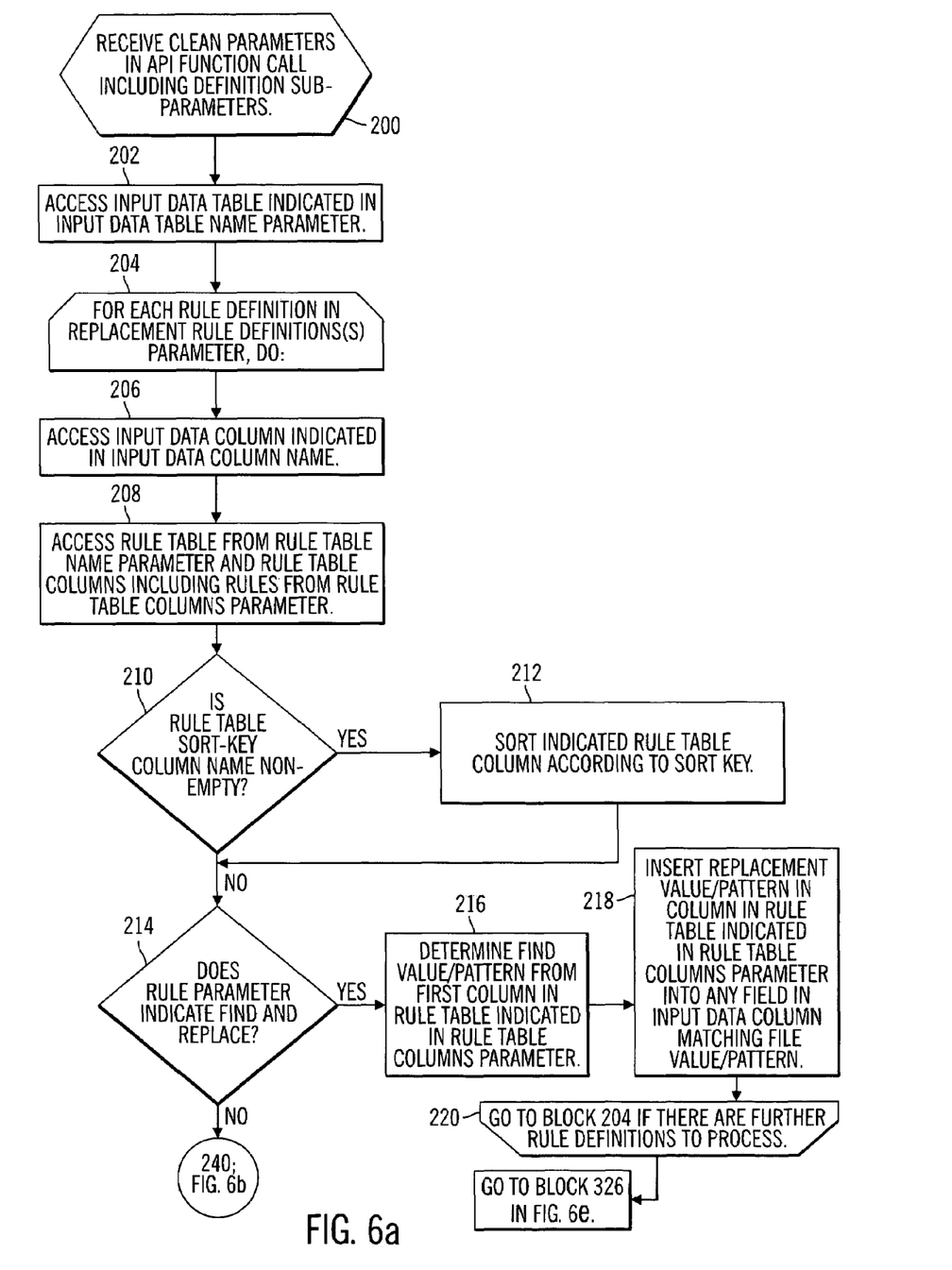
FIGS. 6a, 6b, 6c, 6d, and 6e illustrate logic to clean an input data table in accordance with preferred embodiments of the present invention.
Figure 6B:
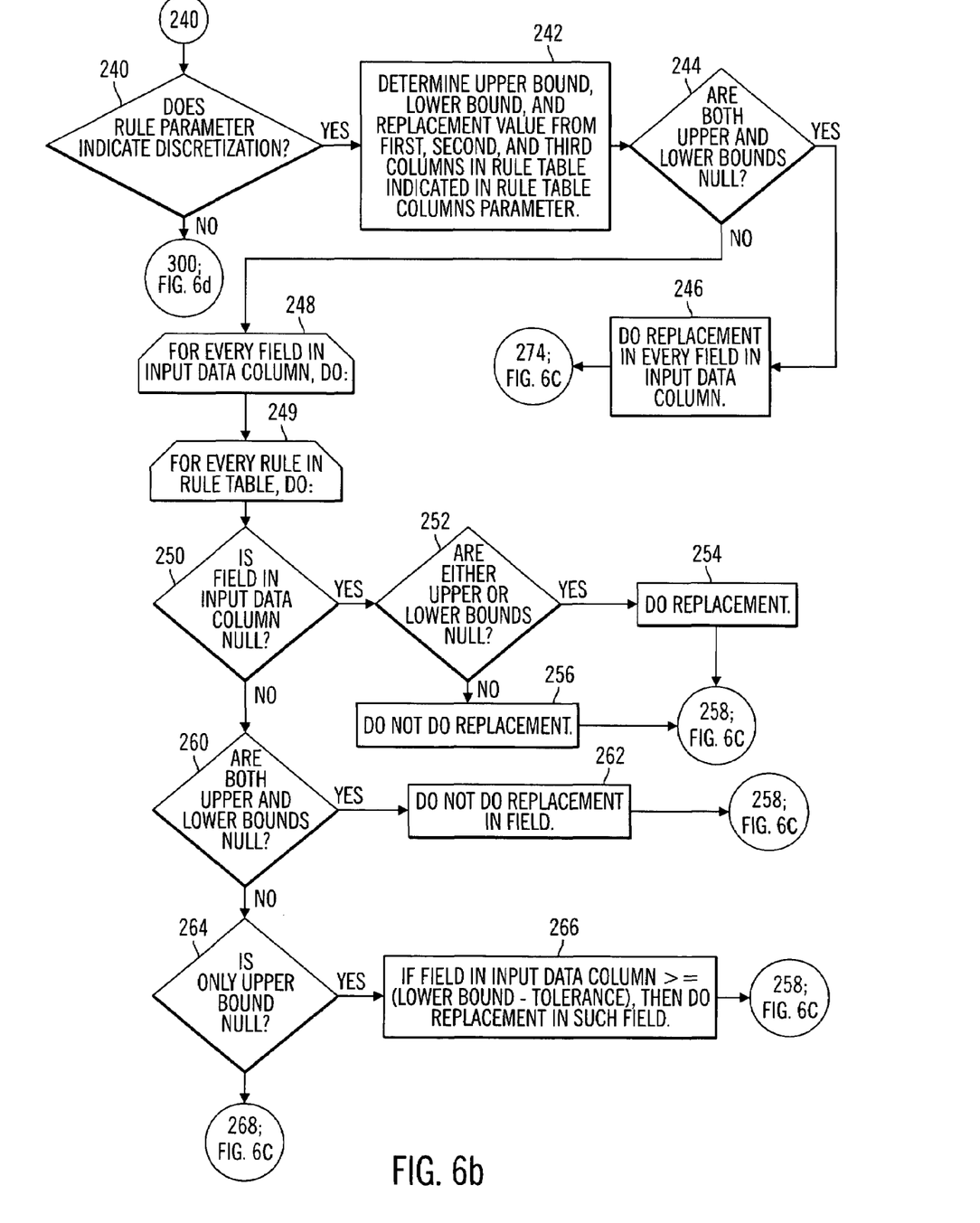
Figure 6C:
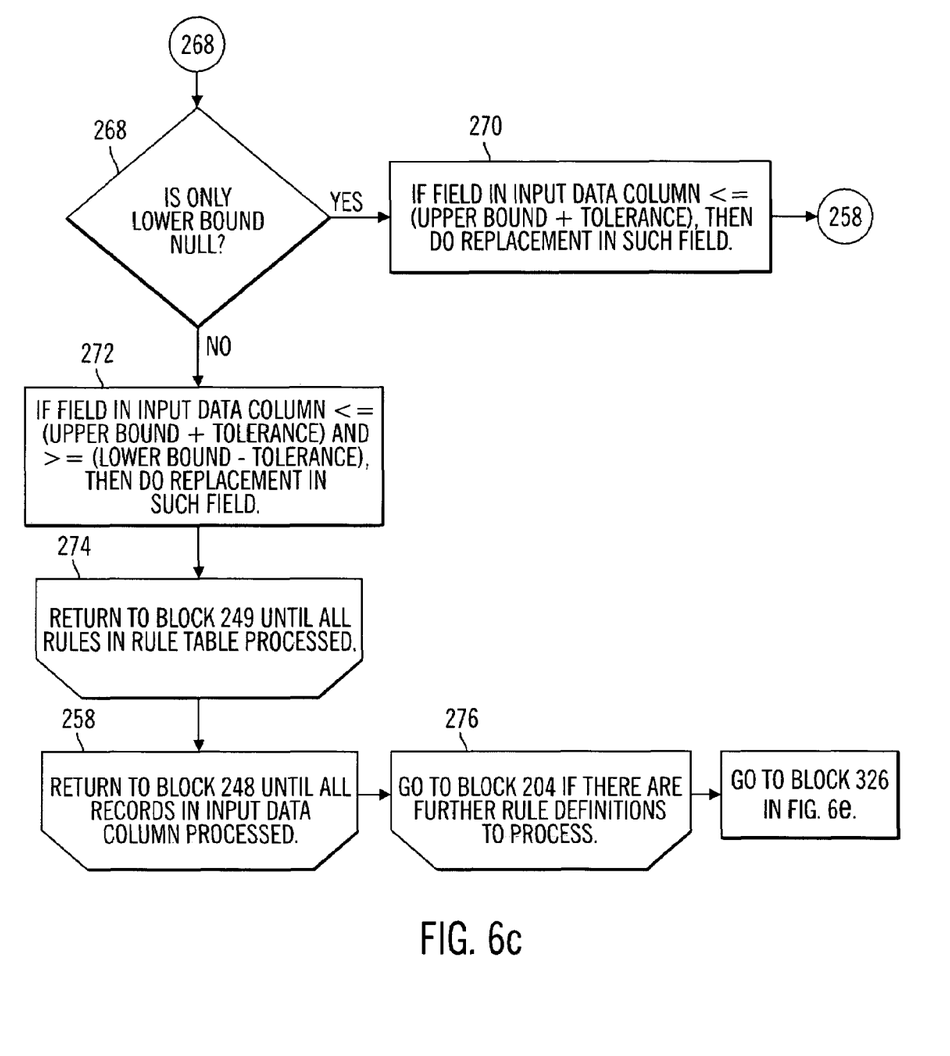
Figure 6D:
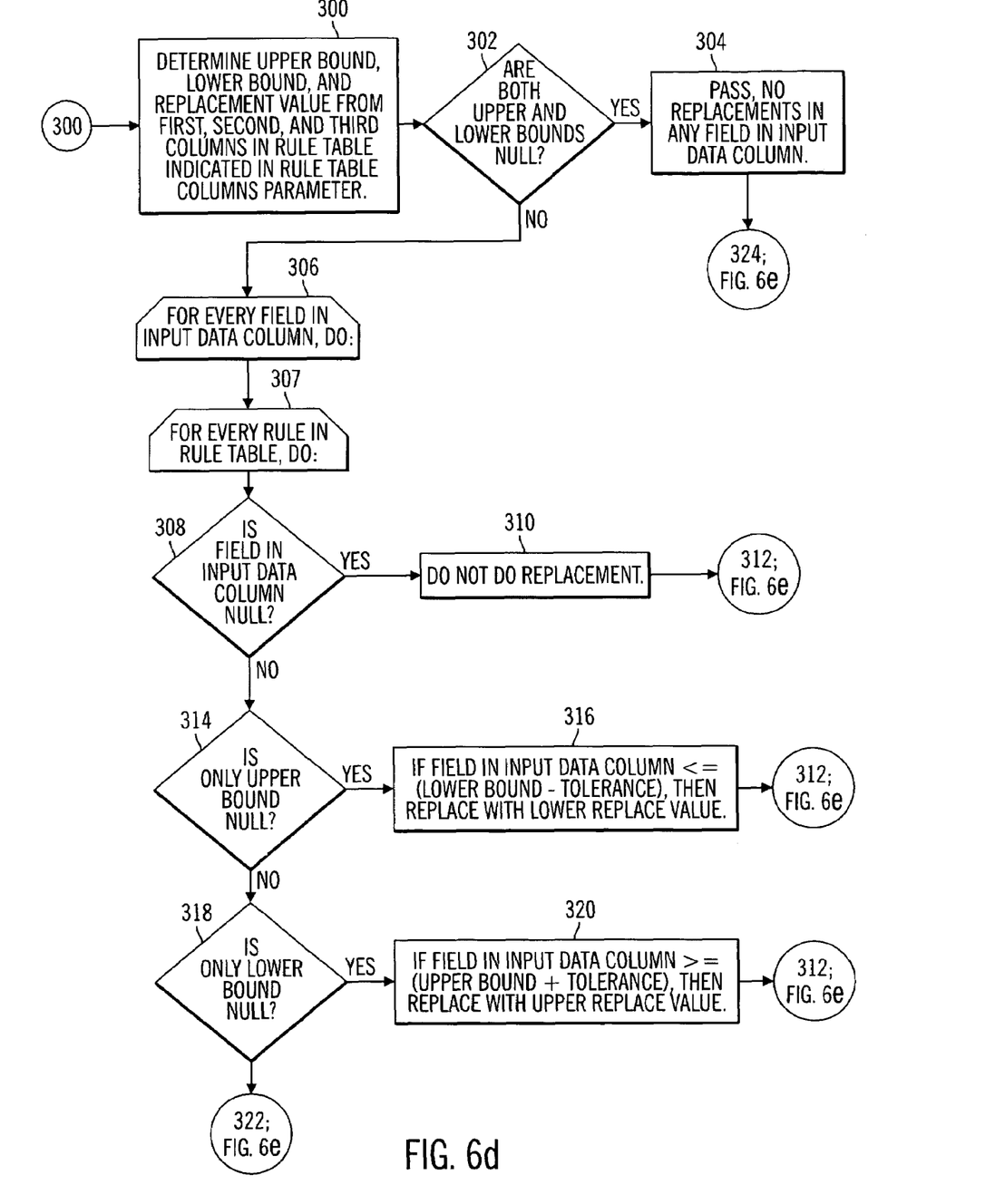

FIGS. 6*a, b, c, d*, and *e* illustrate logic implemented in the clean transform stored procedure 12 (clean transform 12) to clean input data columns according to the clean parameters 50 including definitions 80 in the replacement rule definition(s) 60 parameter. These parameters 50 and sub-parameters 80 comprise the transform rules 16. As discussed, a user at the client 6 would specify certain clean operations to perform and the client side of the clean transform 20 would generate an API function call including the clean parameters 50 and definitions 80 from information the user entered in the GUI. Control begins at block 200 with the clean transform 12 receiving the clean parameters 50 and a set of sub-parameters 80 for each rule definition in an API function call. The clean transform 12 accesses (at block 202) the input table 14 from the database 10 indicated in the input data table name 52. For each rule definition 80 specified in the replacement rule definitions 60 parameter, the clean transform 12 executes a loop to perform operations in FIGS. 6a, b, c, beginning at block 204.

In processing each rule definition, the clean transform 12 accesses (at block 206) the input data column from the input table 14 indicated in the input data column name 82 parameter for the rule definition and accesses (at block 208) the rule table in the server 4 indicated in the rule table name parameter 86 and input columns in the rule table indicated in the rule table columns parameter 92 for the rule definition. The clean transform 12 determines (at block 210) whether the rule table sort-key column name is non-empty. If so, the clean transform 12 sorts (at block 210) the rules in the rule columns for the rule definition according to the order specified in the sort-key column in the rule table. As discussed, a sort-key column may be provided if a rule table includes multiple rules to apply for the rule definition. Otherwise, if the sort key-column parameter 88 is empty, the rule columns are sorted in ascending order. After block 212 or the yes branch of block 210, the clean transform 12 determines (at block 214) whether the rule parameter 90 indicates a find and replace clean operation.

If the clean operation for the current definition is a find and replace, the clean transform 12 determines (at block 216) one or more find values or patterns (if the data type is a character) from the first column in the rule table indicated in the rule table columns parameter 92. The clean transform 12 inserts (at block 218) the replacement value/pattern in the column in the rule table having the same column number as the second column in the rule table columns 92 sub-parameter if one of the find values or patterns matches the field content. Note that if there are multiple find values/patterns in the rule table, then there is a different corresponding replacement value for each separate find/value pattern. The replacement value corresponding to the first matching find value is inserted in the field. The clean transform then returns (at block 220) to block 204 to process the next rule definition 80 in the rule definition parameters 60.

During the find and replace searching, and the searching operations for the discretization and numeric clip rule types, other sub-parameters are considered. If a rule escape character is indicated in sub-parameter 96, the clean transform 12 searches for a character matching the character following the escape character, which may be a character that usually has specific search meaning, such as a percent (%), underscore (_), comma (,) or semicolon (;). Further, if the row clean indicator sub-parameter 94 is set to YES, then any field, i.e., row, in the input data column matching the find value/pattern is not copied to the output table in the current rule definition being applied, or any further rule definitions that may apply to the field or row. If a numeric tolerance sub-parameter 100 is provided, than number fields in the input data column will return a match if the field value is equal to the find value within a range specified by the numeric tolerance. Further, if the ignore white space indicator sub-parameter 98 is YES, then white spaces are removed from the field when determining whether the field matches the find value/parameter; otherwise, white spaces are considered characters.

If the rule indicated in the rule sub-parameter 90 is discretization (at block 240), then the clean transform 12 determines (at block 242) the upper bound, lower bound and replacement values from the accessed rule table. The upper, lower, and replacement columns to access from the rule table maintained in the database program 8a are indicated in the first, second, and third columns in the rule table columns sub-parameter 92, respectively. The clean transform 12 determines (at block 244) whether the upper and lower bounds are both NULL. If so, the clean transform 12 does the replacement (at block 246) in every field in the current input data column. Otherwise, the clean transform 12 begins a loop at block 248 to perform for every field in the input data column. In this loop, the clean transform 12 executes a nested loop between blocks 249 and 274 to consider each rule in the rule table, when there are multiple rules. For each rule, the clean transform 12 determines (at block 250) whether the accessed field in the input data column is NULL. If so, the clean transform 12 determines (at block 252) whether either the upper or lower bounds are NULL. If so, the clean transform 12 inserts (at block 254) the replacement value in the rule table into the field; otherwise, no replacement value is inserted (at block 256). From blocks 254 or 256, control transfers to block 258 where the clean transform 12 performs another iteration of the loop beginning at block 248 for the next field (row) in the input data column.

If the field in the input data columns is not NULL (from the NO branch at block 250), then the clean transform 12 determines (at block 260) whether both the upper and lower bounds are NULL. If so, the clean transform 12 inserts the replacement value into the field and proceeds to block 258 to consider any further rows in the input data column. Otherwise, the clean transform 12 determines (at block 264) whether only the upper bound is NULL. If so, the clean transform 12 inserts (at block 266) the replacement value into the current field if the field in the input data column is greater than the lower bound minus the numeric tolerance for numeric data types where a numeric tolerance is specified. If no numeric tolerance is provided in parameter 100 or the input column is a character type, then there is no consideration of numeric tolerance when performing the find operation. If only the lower bound is NULL (at block 268), then the clean transform 12 inserts (at block 270) the replacement value into the current field if the field in the input data column is less than the upper bound plus any numeric tolerance for numeric data types where a numeric tolerance is specified. If neither the upper nor lower bound are NULL, then the clean transform 12 inserts (at block 272) the replacement value in the field if the field value is less than or equal to the upper bound plus any provided numeric tolerance AND less than or equal to the lower bound minus any provided numeric tolerance. After applying one rule in the rule table at blocks 254, 256, 262, 266, 270 or 272, the clean operation 12 then considers any further rules at block 274 for the current row in the input data table. After finding a match or considering all rules in the rule table for a given field, the clean transform proceeds (at block 258) to consider the next row (field) in the input data column.

After all rows in the input data column are considered from blocks 246 or 258, the clean transform proceeds (at block 276) to block 204 to execute the next rule definition against a specified input data column.

If the rule indicated in the rule parameter 90 is a numeric clip (at block 300 in FIG. 6d), then the clean transform determines (at block 302) the upper bound, lower bound, and replacement value in the columns of the rule table indicated in the rule table columns parameter 92. The clean transform then determines (at block 302) whether both upper and lower bounds are NULL. If so, the clean transform 12 skips (at block 304) the input data column, and inserts no replacement values into any row. Otherwise, the clean transform 12 begins a loop at block 306 to process each row in the input data column. The clean transform 12 begins a nested loop at block 307 to consider each rule in the rule table, if there are multiple rules. The clean transform 12 determines (at block 308) whether the field content is NULL. If so, the clean transform 12 does not insert (at block 310) the replacement value for any into the field and proceeds (at block 312) to consider the next row in the column until all rows are processed. If only the upper bound is null (at block 314), then the clean transform 12 inserts the lower replacement value in the field (at block 316) if the field value is less than the lower bound minus any numeric tolerance indicated in sub-parameter 100. If only the lower bound is NULL (at block 318), then the clean transform 12 inserts the upper replacement value in the field (at block 320) if the field value is greater than the upper bound plus any numeric tolerance. If neither the lower nor upper bound are NULL, then the clean transform 12 inserts (at block 322) the lower replacement value if the field is less than or equal to the lower bound minus any numeric tolerance OR inserts the upper replacement value if the field is greater than or equal to the upper bound plus any tolerance. After applying one rule against one field at blocks 310, 316, 320 or 322, the clean transform 12 then proceeds (at block 323) back to block 307 to consider the next rule in the rule table, if there are further rules. After applying all rules in a rule table to one field (row), the clean transform 12 proceeds (at block 312) back to block 36 to consider the next field (row) in the input data column.

Figure 6E:
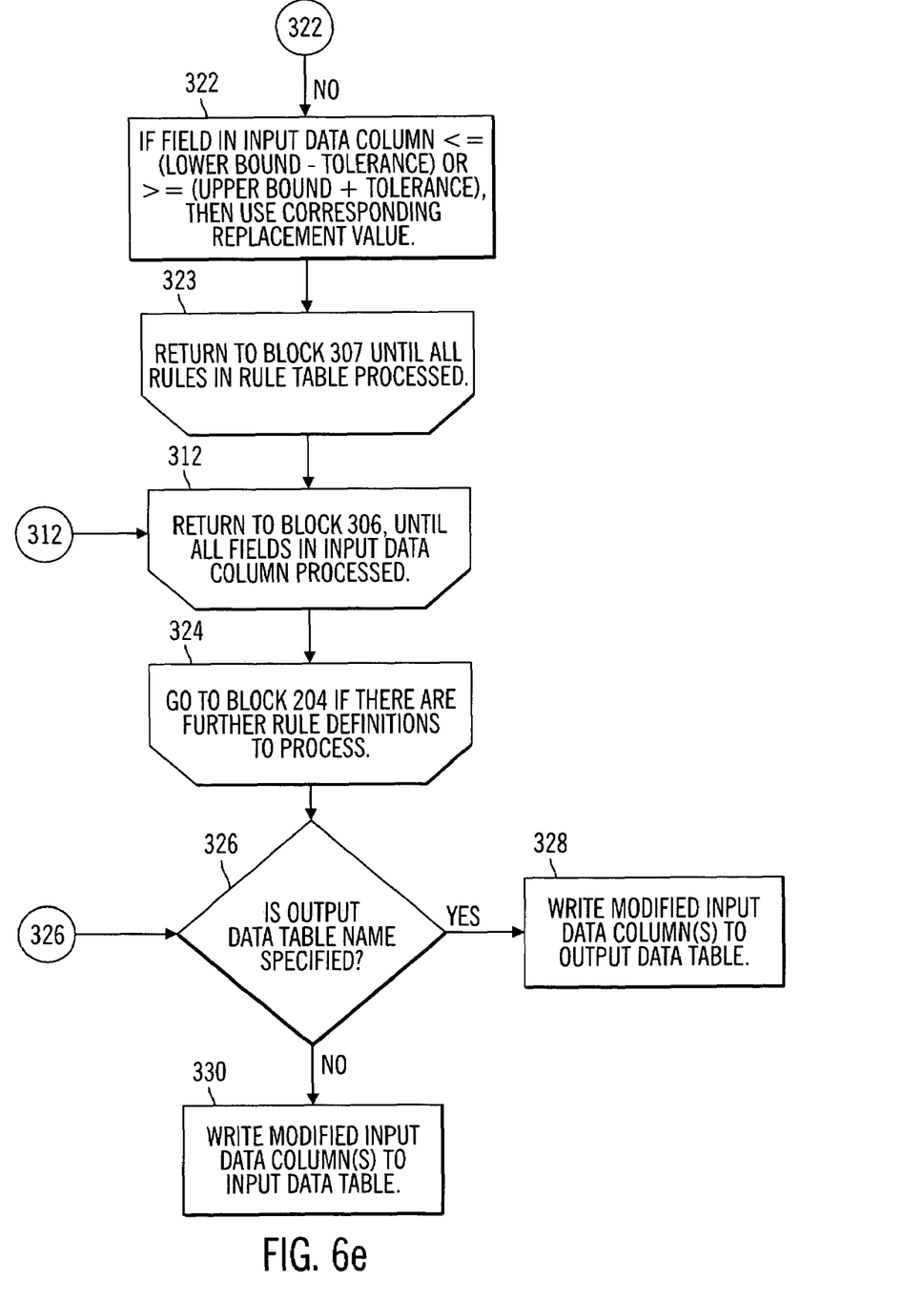

After processing all rules in the rule table and rows in the input data column from block 312 or block 324, the clean transform 12 proceeds (at block 324) to block 204 to consider any further rule definitions in the replacement rule definition parameter 60. After the last rule definition 80 in the replacement rule definitions parameter 60 is processed at blocks 220, 274 or 324, then the clean transform 12 then determines (at block 326) whether the output data table name 54 specifies an output data table 18 in the database 10 to receive any cleaned or modified input data columns. If so, then the clean transform 12 writes (at block 328) the input data columns, including replaced and cleaned fields, to the specified output data table 19. Otherwise, the modified and processed input data columns are written (at block 330) to the input table 14.

Preferred embodiments provide a command data structure to control a stored procedure program to clean columns of data in an input table the database 10. The rules to clean the tables may be provided in a rule table data structure stored in the server 4 that provides one or more clean rules for different columns and in different sequences. This allows a single instance of execution of the clean program to perform numerous types of operations on the columns in the input table. Preferred embodiments thus provide a flexible and programmable data structure and program to provide fine grained control of clean operations. Further, with preferred embodiments, the client 6 does not increase network traffic because the client does not transfer the tables or the rule tables to clean between the database server 4. Instead, the client 6 merely provides a command data structure including various parameters and rules to a stored procedure 12 that executes in the server 4 to perform the clean operations within the database program 8 on the server 4. Such savings in network traffic can be significant when very large database tables, including millions or billions, of records are cleaned.

Figure 7:
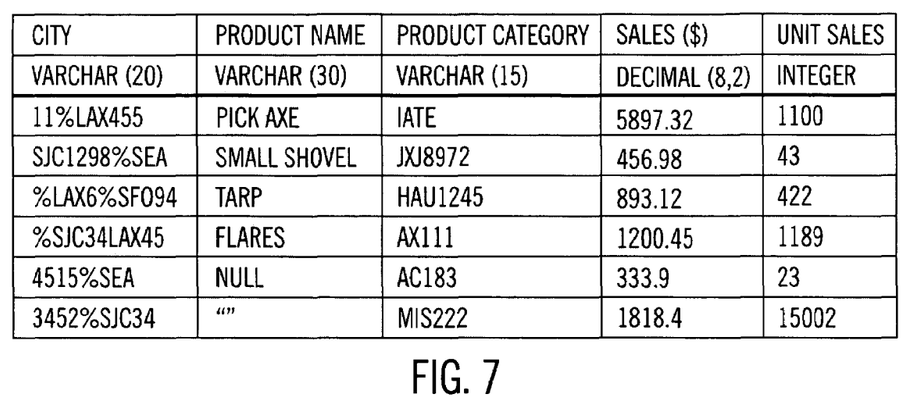
FIG. 7 illustrates an example of an input data table.
Figure 8A:
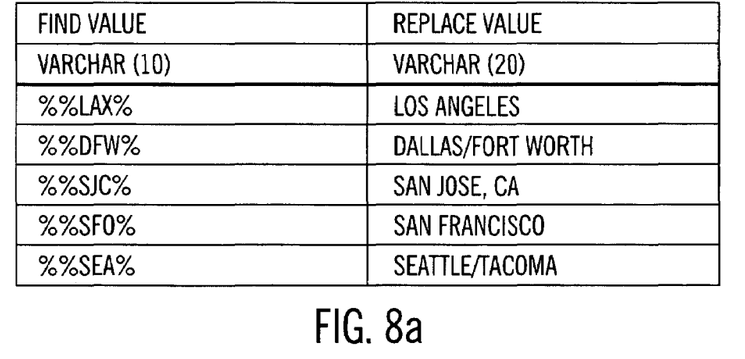
FIGS. 8a, 8b, 8c, and 8d illustrate examples of rule table to apply to clean columns in the input data table in FIG. 7 in accordance with preferred embodiments of the present invention.

FIGS. 7 and 8a, b, c, d illustrate an example of how rule tables may be applied to clean an input data table. FIG. 7 illustrates an input data table to be cleaned including columns concerning sales information: city, indicating the sale location; product name; product category; dollar sales; and unit sales. FIGS. 8a, b, c, and d illustrate different rule tables to apply to columns in the input table in FIG. 7. FIG. 8a illustrates a find and replace rule to locate certain strings in the City column that begin and end with "%". The first percent in the find value represents any string of zero or more characters. An escape character of "/" is indicated in parameter 96 so the search criteria includes strings that start and end with the percent sign (%). The replace value is on the right. Thus, FIG. 8a illustrates a rule table including multiple rules having search criteria to apply against each field in a column, e.g., the CITY column, of the input data table. FIG. 8a would remove the abbreviations in the CITY input data column and replace them with a complete city name for the replacement value corresponding to the find value matching the field in the City column.

Figure 8B:
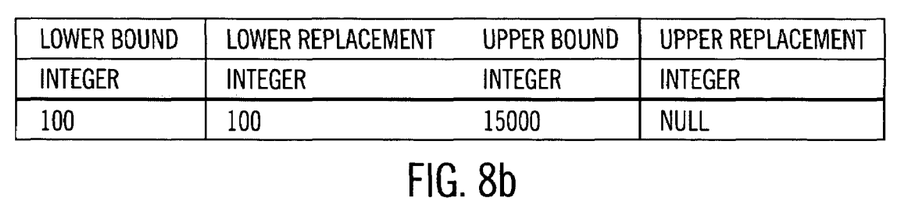

FIG. 8b provides a numeric clip rule table. In the Unit Sales column, values less than 100 are considered invalid and will be rounded up to 100, and any sales number greater than 15,000 is considered NULL. Later, the rule table in FIG. 8d will be used to flag rows with a NULL value to avoid in calculations. Thus, the rule table in FIG. 8b processes each field in the Unit Sales data column and replaces values less than 100 with 100 and replaces values greater than 15,000 with NULL. A numeric tolerance may be specified to apply the rule to values "close enough" to the lower or upper bound.

Figure 8C:
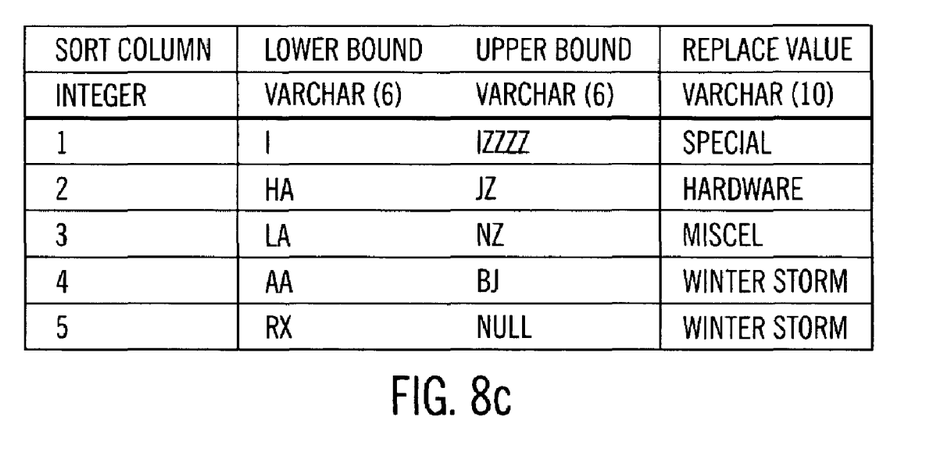
Figure 8D:
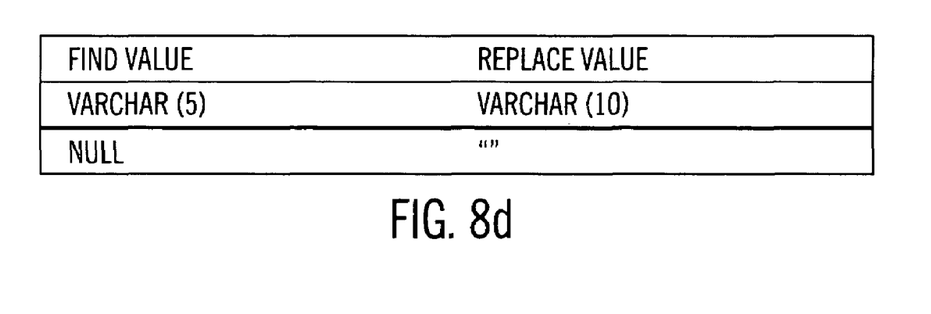

FIG. 8c is a discretization rule table used to replace the code values in the Product Category column of the table in FIG. 7 with meaningful descriptive terms. Code values within certain string ranges are a particular type of product. For instance, a Category code in the range from "HA" to "JZ" is a hardware product. The application of the rule table in FIG. 8c determines which rule has a lower and upper bound that includes the Product Category field and applies the corresponding Replace Value for the rule having the matching find bounds. The Upper Bound in the last row of the rule table in FIG. 8c includes a NULL value. This means the replacement value is inserted in any field in the Product Category column having a string value greater than "RX." FIG. 8c further provides a sort column, which would be included in the sort-key column name parameter 88, indicating the order in which to sort the rows in the rule table before applying the rule table to the input column FIG. 8d is a find and replace table used to clean up the already processed data in the input table in FIG. 7. A rule definition including the rule table in FIG. 8d and having the row clean indicator parameter 94 set to YES would eliminate from further processing and from the final revised table any row in the input table (FIG. 7) having a product name of NULL. If the compress white space indicator is set in the parameters with the rule definition including FIG. 8d applied to the Product Name column, then any white space will be removed from the product name, such as the spaces between "Pick Axe" in the first data row of the input table in FIG. 7.

CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to specific data structures, such as a rule table having columns of rules, and an arrangement of parameters to provide a vehicle for transferring commands to the clean transform stored procedure program. However, those skilled in the art will recognize that modifications may be made to the architecture of the data structures used to convey multiple clean rules and still remain within the scope of the present invention.

Preferred embodiments were described with respect to three rule types, find and replace, discretization, and numeric clip. In further embodiments, other types of rules may be provided and included in the command data structure of the preferred embodiments to perform different types of clean operations known in the art.

In preferred embodiments, the clean transform program was executed in a stored procedure type program, such as that used in the IBM DB2 database system. However, in further embodiments, different types of application programs, other than stored procedure programs, may be executed in the server 4 or even the client 6 to perform clean operations in accordance with the command data structures of the preferred embodiments.

In preferred embodiments, the input table and output table were included in a database in the server in which the clean transform program is executing. In alternative embodiments, the rule, input, and output tables may be distributed at different storage locations at different network devices.

In preferred embodiments, a client constructed the clean operation command and communicated such commands to the database server. In alternative embodiments, the clean operation command of the preferred embodiments may be executed on the machine used to construct the command.

In summary, preferred embodiments disclose a method, system, program, and data structure for performing a clean operation on an input table. The input table to clean is indicated in an input data table name. At least two one rule definition is processed to clean the input table. Each rule definition indicates a find criteria, a replacement value, and an input data column in the input table. For each rule definition, the input data column is searched for any fields that match the find criteria. The replacement value for the particular rule definition is inserted in the fields in the input data column that match the find criteria. Subsequent applications of additional rule definitions applied to the same input data column operate on replacement values inserted in the input data column during previously applied rule definitions.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for performing a clean operation on an input table having an input table name, comprising:

receiving at least one rule definition, wherein each rule definition indicates a find criteria, a replacement value, and an input data column in the input table, wherein each rule definition is associated with one rule table including the find criteria and replacement value, and wherein a rule table column parameter for each rule definition indicates the columns in the rule table including the find criteria and replacement value for the rule definition;

searching, for each rule definition, the input data column for any fields that match the find criteria;

determining whether the rule definition specifies an output table; and in response to determining that the rule definition does not specify an output table, directly inserting, for each rule definition, the replacement value in the fields in the input data column that match the find criteria, wherein subsequent applications of additional rule definitions applied to the same input data column operate on replacement values inserted in the input data column in previously applied rule definitions.

2. A computer implemented system for performing a clean operation on an input table having an input data table name, comprising;

means for receiving at least one rule definition, wherein each rule definition indicates a find criteria, a replacement value, and an input data column in the input table, wherein each rule definition is associated with one rule table including the find criteria and replacement value, and wherein a rule table column parameter for each rule definition indicates the columns in the rule table including the find criteria and replacement value for the rule definition;

means for searching, for each rule definition, the input data column for any fields that match the find criteria;

means for determining whether the rule definition specifies an output table; and means for, in response to determining that the rule definition does not specify an output table, directly inserting, for each rule definition, the replacement value in the fields in the input data column that match the find criteria, wherein subsequent applications of additional rule definitions applied to the same input data column operate on replacement values inserted in the input data column in previously applied rule definitions.

3. An article of manufacture for use performing a clean operation on an input table in a database having an input data table name, the article of manufacture comprising computer usable media including at least one computer program embedded therein that causes the computer to perform:

receiving at least one rule definition, wherein each rule definition indicates a find criteria, a replacement value, and an input data column in the input table, wherein each rule definition is associated with one rule table including the find criteria and replacement value, and wherein a rule table column parameter for each rule definition indicates the columns in the rule table including the find criteria and replacement value for the rule definition;

searching, for each rule definition, the input data column for any fields that match the find criteria;

determining whether the rule definition specifies an output table; and in response to determining that the rule definition does not specify an output table, directly inserting, for each rule definition, the replacement value in the fields in the input data column that match the find criteria, wherein subsequent applications of additional rule definitions applied to the same input data column operate on replacement values inserted in the input data column in previously applied rule definitions.

4. A memory device including a command data structure, comprising:

an input data table name parameter indicating the input table subject to the clean operation; and at least one rule definition, wherein each rule definition includes a find criteria, a replacement value, and an input data column in the input table, wherein, for each rule definition, the input data column is searched for any fields that match the find criteria, wherein, for each rule definition, it is determined whether the rule definition specifies an output table, and in response to determining that the rule definition does not specify an output table, the replacement value is directly inserted in the fields in the input data column that match the find criteria, wherein subsequent applications of additional rule definitions applied to the same input data column operate on replacement values inserted in the input data column in previously applied rule definitions, and wherein at least one rule definition further includes: an indication of one rule table including the find criteria and replacement value for the at least two rule definitions, such that the one rule table includes the find criteria and replacement value for the at least two rule definitions and a rule table column parameter for the at least two rule definitions indicating the columns in the rule table including the find criteria and replacement value for the rule definitions.

* * * * *